United States Patent [19]

Kennedy

[11] Patent Number: 4,939,184

[45] Date of Patent: Jul. 3, 1990

[54] POLYURETHANE FOAM

[75] Inventor: Joseph P. Kennedy, Akron, Ohio

[73] Assignee: University of Akron, Akron, Ohio

[21] Appl. No.: 320,119

[22] Filed: Mar. 7, 1989

[51] Int. Cl.$^5$ .................. C08G 18/04; C08G 18/14
[52] U.S. Cl. .................................... 521/170; 528/75
[58] Field of Search .................. 521/117, 170; 528/75

[56] References Cited

U.S. PATENT DOCUMENTS 3,784,522  1/1974  Giray .................................. 521/170
4,224,418  9/1980  Dieterich et al. .................. 521/170
4,242,468  12/1980  Baack et al. ........................ 521/170

OTHER PUBLICATIONS

Product Data Bulletin No. 505, May 1965, 521/170, Poly B-D, Sinclair Petrochemicals.

Primary Examiner—Morton Foelak
Attorney, Agent, or Firm—Oldham & Oldham Co., LPA

[57] ABSTRACT

The invention relates to a polyurethane foam, more particularly relates to a polyurethane foam having excellent tensile strength, resistance to moist heat, resistance to heat, together with excellent waterproofness, and low impact resilience. Such a polyurethane foam is particularly useful as sealing material and the like for engineering works, construction and vehicles which require waterproofness, for example. Such a polyurethane foam is also useful as an excellent padding material for the construction of safe automobile, railroad and space vehicle interiors where high damping and good gas barrier properties are important.

10 Claims, 2 Drawing Sheets

POLYURETHANE FOAM

BACKGROUND OF THE INVENTION

Hitherto, flexible polyurethane foams, with large commercial application, have been based on polyol skeletons such as polyethers and polyesters. Flexible polyurethanes made from polyethers and polyesters are inherently subject to hydrolysis because both of the resulting polyurethane foams are hydrophilic in nature. Although polyether polyurethane foams are more resistant to hydrolysis than polyester polyurethane foams, both still suffer from hydrolytic instability, and, therefore, are not usable in applications which require extended periods in contact with water such as waterproofing. These two types of flexible polyurethane foams also have low oxidative resistance and therefore, possess rather poor weathering properties.

Other flexible polyurethane foams also have been prepared using more hydrophobic flexible units such as hydroxy terminated polybutadienes and hydroxy terminated polyethylene-polypropylene copolymers. Although these flexible polyurethane foams have excellent resistance to hydrolysis, they both have poor weathering and heat resistance due either to the existence of double bonds in the case of the polybutadiene polyurethane foams, or active hydrogens, tertiary hydrogens, in the case of polyethylene-polypropylene polyurethane foams.

OBJECT OF THE INVENTION

An object of the invention is to solve the above-described shortcomings of the prior polyurethane foams, and to provide new flexible polyurethane foams having a host of uniquely superior physical properties such as waterproofness, low impact resilience, and low transition temperature, high oxidative resistance, high ozone resistance, low gas permeability, and other similar properties. The polyurethane foams according to the present invention will find application in waterproofing, vehicle interior safety padding in gas retention sealants and other uses require the above stated properties.

DETAILED EXPLANATION OF THE INVENTION

Figure 1:
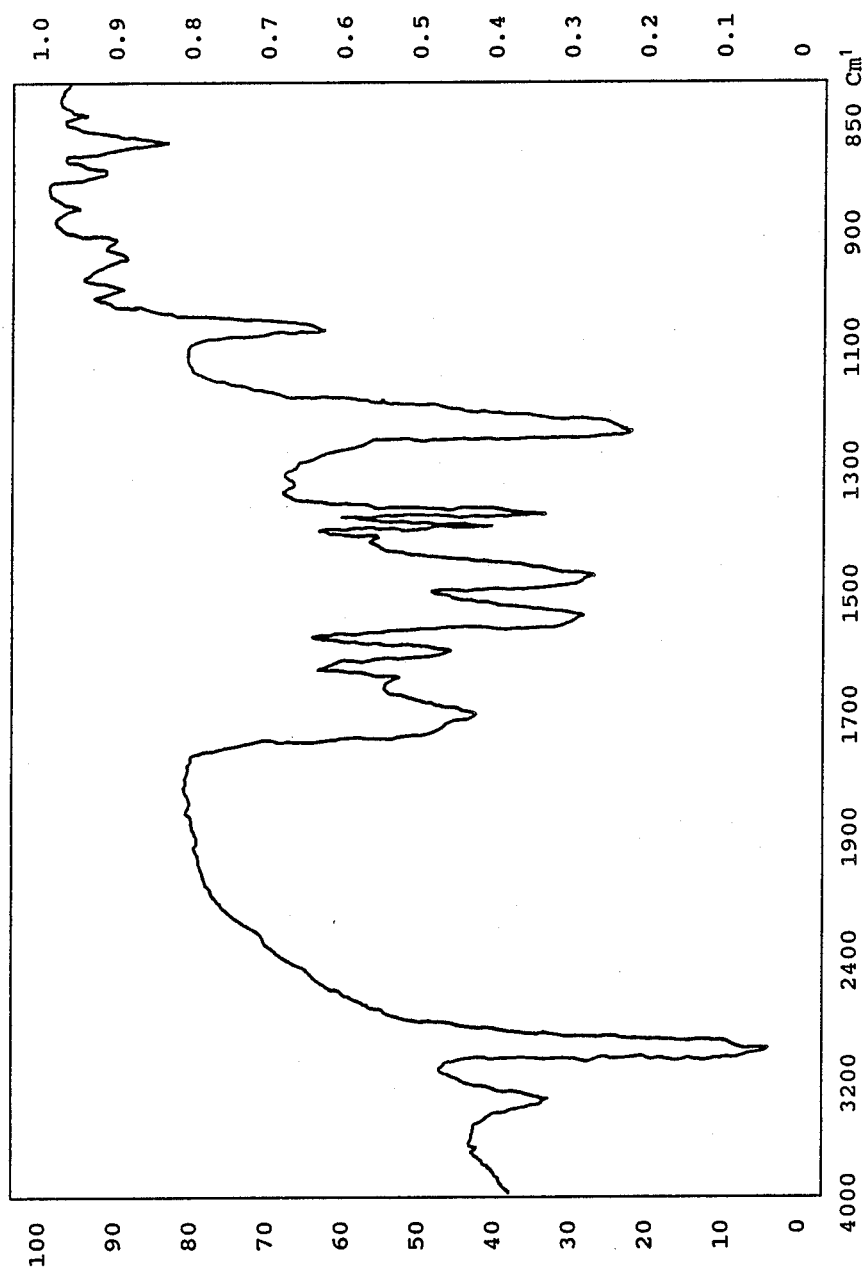
FIG. 1 is a graph showing an infrared spectrum of the polyurethane foam in Example 1.

As a means for solving the above problems, the invention is a flexible polyurethane foam having a polyisobutylene skeleton obtained by reacting a polyol based on polyhydroxy terminated polyisobutylene with a polyisocyanate in the presence of a blowing agent with two and three terminal hydroxy groups per polyisobutylene unit preferred.

The hydroxy terminated polyisobutylene skeletons used in the invention are prepared by means that introduce hydroxy groups into the terminal positions by dehydrochlorinating, hydroborating and oxidizing polyfunctional polyisobutylene having terminal chlorine atoms. Said chloro terminated polyisobutylenes are obtained by cationically polymerizing an isobutylene monomer

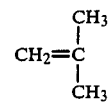

to a molecular weight of 1000-10000. A particularly preferable molecular weight is 2000-7000.

The polyisocyanate compound used in the invention can be organic isocyanates having at least two isocyanate groups per 1 molecule, and may be of low, high or medium molecular weight. As such organic isocyanate, mention may be made of ethylenediisocyanate, trimethylenediisocyanate, dodecamethylenediisocyanate, hexamethylenediisocyanate, tetraethylenediisocyanate, pentamethylenediisocyanate, propylene-1,2-diisocyanate, 2,3-dimethyltetramethylenediisocyanate, butylene-1,2-diisocyanate, butylene-1,3-diisocyanate, 1,4-diisocyanate-cyclohexane, cyclopentene-1,3-diisocyanate, p-phenylene-diisocyanate, 1-methylphenelene-2,4-diisocyanate, naphthalene-1,4-diisocyanate, toluenediisocyanate, diphenyl-4,4,-diisocyanate, benzene-1,2,4-triisocyanatae, xylene-1,4-diisocyanate, xylene-1,3-diisocyanate, 4,4,-diphenylenemethanediisocyanate, 4,4,-diphenylenepropanediisocyanate, 1,2,3,4-tetraisocyanatebutane, butane-1,2,3-triisocyanate, polymethylenepolyphenyl-isocyanate and the like and in addition to the above, use may be made of other organic polyisoccyanates having at least two isocyanate functional groups.

In case of expanding foams by reacting the above materials, water is used as a blowing agent, but it is possible to add a catalyst, a foam stabilizer, a viscosity modifier, an organic solvent as a blowing agent, and each kind of organic or inorganic additives, such as a fire retardant and the like. As the catalyst, use may be made of amine and tin catalysts used in case of manufacturing common polyurethane foam, and as the foam stabilizer, it is possible to use a silicone surfactant hitherto used. As the organic solvent, mention may be made of low boiling point hydrocarbon such as pentane, hexane, heptane, pentene, heptene, benzene and the like, or low boiling point halogenated hydrocarbon such as trichloromonofluoro methane, dichlorofluoromethane, methylene chloride and the like, and low boiling point hydrocarbon ether such as tetrahydrofuran, diethylether, 1,4-dioxane and the like, having a role as a blowing agent in addition to the object of lowering a viscosity.

As a foaming process in the invention, it is possible to use either one of a prepolymer process or a one-shot process, but the prepolymer process is preferable in the point of stability at the time of expanding foams.

Since polyisobutylenes having terminal hydroxy groups are hydrophobic and repell water, such foams show excellent waterproofness. Further, since the molecular structure does not contain any double bond, ester bond and methine hydrogen, there is no deterioration caused by hydrolysis, oxidation and the like, and water resistance is excellent. Moreover, the polyisobutylene skeleton is a repetition of the following formula.

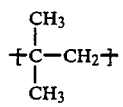

Foams obtained from the above formula have high hysteresis, that is a large loss coefficient because the geminal methyl groups that occur on alternate carbon chain atoms cause the foam to resist externally applied force by mechanical energy dissipation. Such characteristics give a foam excellent soundproofing and damping properties. Further, such foams also exhibit excellent low temperature characteristics because of the low crystallizability of polyisobutylene and its low glass transition temperature.

When the molecular weight of polyisobutylene having terminal hydroxy groups used is less than 1000, the foam becomes hard, and loses its flexibility. On the other hand, when the molecular weight thereof exceeds 10000, it becomes difficult to obtain a good foam because the viscosity becomes extremely high and blowing becomes difficult. Therefore, the molecular weight of polyisobutylene having terminal hydroxy groups is limited to within the range of 1000–10000, preferably within the range of 1500–7000.

The foam density can be regulated by the amount of water to be added. In the prepolymer process for example, the amount of water added to 100 parts by weight of a prepolymer is preferably 0.5–3.0 part by weight. The reason therefore is because when the amount is less than 0.5 part by weight, the foam density becomes too high, while when the amount exceeds 3 parts by weight, compatibility with water is worse and the cells become too coarse for a good foam.

The invention will be explained by referring to examples as follows.

EXAMPLE 1

The raw or starting material was a tri-hydroxy terminated polyisobutylene having a molecular weight of 7000. The manufacturing method is as follows.

As an initiator, 1,3,5-tris (2-methoxypropane)-benzene (hereinafter abreviated as "TriCuOMe") and $BCl_3$ were used. The amounts used were 0.041 moles of TriCuOMe and a fivefold equivalent of $BCl_3$ per methoxy group. The initiator was dissolved in the solvent methyl chloride, 345 ml of isobutylene monomer was added thereto inside a dry box under the inert gas nitrogen at $-60°$ C., and polymerization was carried out by the living carbocation polymerization method. The polymerization was terminated by the addition of methanol to obtain about 190 g of tri-chloro terminated polyisobutylene. AFter extracting a small quantity of low molecular components from the obtained polymer, dehydrochlorination was carried out using potassium t-butoxide (t-BuOK) in tetrahydrofuran (THF) as a solvent to obtain about 165 g of polyisobutylene having a double bond at each terminal position. Then, the thus obtained polyisobutylene was dissolved in THF and hydroborated with $BH_3$, thereafter potassium hydroxide and hydrogen peroxide solution were added to obtain about 120 g of polyisobutylene having terinal hydroxy groups. The thus obtained polymer had a molecular weight of 7000 (measured by VPO), three (3) hydroxy group (measured by FTIR), and a molecular weight distribution of $Mw/Mn=2.1$ (measured by GPC).

100 parts of the hydroxy terminated polyisobutylene (molecular weight 7000, three (3) hydroxy groups) obtained as described above was reacted with 18.5 parts of an organic isocyanate (made by Mobay, Tradename: Mondur TD-80) in the presence of 60–100 parts of methylene chloride as a viscosity depressant at $45°$ C. for 19 hours to obtain a prepolymer having 5.7% of isocyanate group (NCO). After producing this prepolymer, residual methylene chloride was removed. Then, 100 parts of this prepolymer were mixed with water as a blowing agent, a catalyst, and other ingredients at a mixing ratio (weight ratio) described at the upper part of Table 1, and a polyurethane foam having a polyisobutylene resin skeleton was formed by foaming.

The infrared spectrum of the resulting polyurethane foam is shown in FIG. 1. In the infrared spectrum shown in FIG. 1, a large peak based on

vibration of isobutylene skeleton

is confirmed at 1220 $cm^{-1}$.

EXAMPLE 2

Trifunctional terminal hydroxy group polyisobutylene having molecular weight of 3650 was synthesized by the same method as in Example 1. In this case, the amount of TriCuOMe used was 0.054 mole, the amount of isobutylene monomer was 144 ml; the final polyisobutylene having three (3) terminal hydroxy groups was about 90 g, the molecular weight was 3650, the terminal hydroxy group number was 3, and the molecular weight distribution was $Mw/Mn=1.7$.

100 parts of polyisobutylene having three (3) terminal hydroxy groups (molecular weight 3650, terminal hydroxy group number 3) obtained as described above was reacted with 22.4 parts of organic isocyanate (the same one as in Example 1) in the presence of 30–50 parts of methylene chloride as a viscosity depressant at $55°C$. for 17 hours to obtain a prepolymer having 0.6% of isocyanate group (NCO). The foaming method was the same as in Example 1 (the mixing ratio is shown in Table 1), and a polyurethane foam having a polyisobutylene resin skeleton was formed.

From the infrared spectrum of the resulting polyurethane foam, a large peak based on vibration of isobutylene skeleton is confirmed as shown in Example 1.

EXAMPLE 3

The raw or starting material is a di-hydroxy terminated polyisobutylene having a molecular weight of 7000. The manufacturing method is as follows.

As an initiator, 1,3-bis (2-methoxypropane)-benzene (hereinafter abreviated as "BiCuOMe") and $BCl_3$ is used. The amounts used were 0.041 moles of BiCuOMe and a fivefold equivalent of $BCl_3$ per methoxy group.

The initator is dissolved in the solvent methyl chloride, 345 ml of isobutylene monomer is added thereto inside a dry box under the inert gas nitrogen at −60°C., and polymerization is carried out by the living carbocation polymerization method. The polymerization is terminated by the addition of methanol to obtain about 190 g of di-chloro terminated polyisobutylene. After extracting a small quantity of low molecular components from the obtained polymer, dehydrochlorination is carried out using potassium t-butoxide (t-BuOK) in tetrahydrofuran (THF) as a solvent to obtain about 165 g of polyisobutylene haivng a double bond at each terminal position. Then, the thus obtained polyisobutylene is dissolved in THF and hydroborated with $BH_3$, thereafter potassium hydroxide and hydrogen peroxide solution is added to obtain about 120 g of polyisobutylene having terinal hydroxy groups.

100 parts of the hydroxy terminated polyisobutylene (molecular weight 7000, two (2) hydroxy groups) obtained as described above is reacted with 14.0 parts of an organic isocyanate in the presence of 60–100 parts of methylene chloride as a viscosity depressant at 45°C. for 19 hours to obtain a prepolymer having 5.7% of isocyanate group (NCO). After producing this prepolymer, residual methylene chloride is removed. Then, 100 parts of this prepolymer is mixed with water as a blowing agent, a catalyst, and other ingredients at a mixing ratio (weight ratio) described at the upper part of Table 1, and a polyurethane foam having a polyisobutylene resin skeleton is formed by foaming.

EXAMPLE 1

100 parts of polybutadienepolyol (made by ARCO, Tradename: R-45HT, functional group number 2-3) was reacted with 22.3 parts of organic isocyanate (the same as in Example 1) at 50°C. for 2 hours to obtain a prepolymer of 5.7% of isocyanate group (NCO). With the use of 100 parts of this prepolymer, polybutadienepolyurethane foam was formed by mixing at the mixing ratio (weight ratio) described in the part of Table 1.

COMPARATIVE EXAMPLE 2

100 parts of polyetherpolyol (made by Dow, Tradename: Voranol, functional group number 3) was reacted with 24.1 parts of organic isocyanate (the same as in Example 1) at 55°C. for 18 hours to obtain a prepolymer having 5.6% of isocyanate group (NCO). With the use of 100 parts of this prepolymer, a polyetherpolyurethane foam was formed by mixing at the mixing ratio (weight ratio) described in the upper part of Table 1.

Figure 2A:
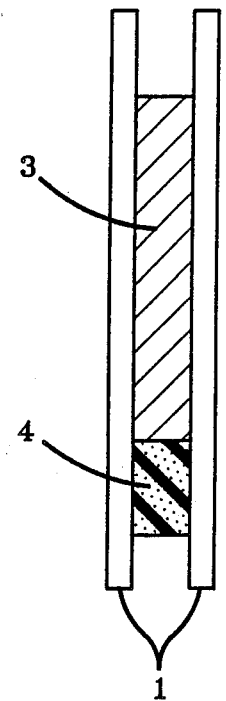
FIGS. 2(a) and 2(b) are a front view and a side view showing a waterproof test method, respectively
1 . . . flat glass, 2 . . . silicone sealant
3 . . . water, 4 . . . foam sample
Figure 2B:
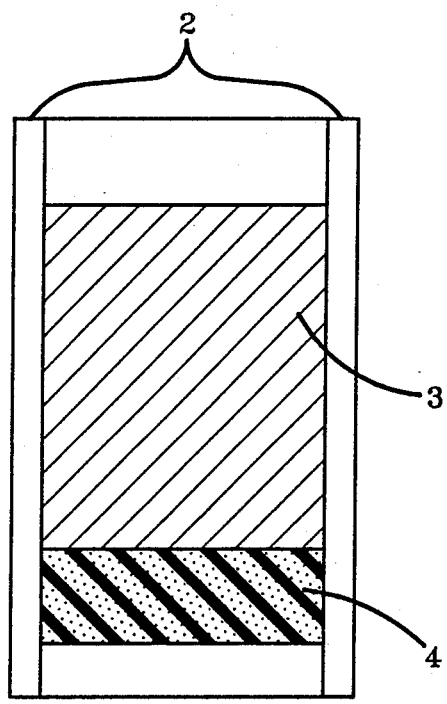

In the lower part of Table 1 are shown physical properties measured values of polyurethane foam samples manufactured in the above examples and comparative examples. In Table 1, thermal resistance and moist heat resistance tests shows values obtained by ASTM D357. Further, as to the impact resilience test, a steel ball of 8 mm in diameter was dropped from a height of 500 mm on a 5 mm thick rebound sample through a glass tube, and a value was obtained from the height of the bounce. As to the waterproof test, as shown in FIGS. 2(a) and 2(b), a foam sample of 4–5 mm in thickness, 1 cm in length and 2 cm in breadth was sandwiched between two flat glass plates 1 and compressed 60%, thereafter the flat glass plates were fixed together by a silicone sealant 2, water 3 was placed at a height of 5 cm from the upper surface of the foam (hydraulic pressure 5 g/cm$^2$), and the time measured was that elapsed between placing water on the foam and the first appearance of water passing through the foam. To facilitate the observation of the first drop of water leaving the bottom surface of the colorless foam the water was dyed by a drop or two of blue ink.

TABLE 1

|  |  | Example | | Comparative | |
|---|---|---|---|---|---|
|  |  | 1 | 2 | 1 | 2 |
| Composition | Prepolymer | 100 | 100 | 100 | 100 |
|  | Water | 1.2 | 1.1 | 1.2 | 1.2 |
|  | Catalyst DABCO-33LV Air Product Co. | 3.0 | 3.0 | 2.0 | 2.5 |
|  | Silicon 5043 Dow Corning | 0.2 | 1.5 | 1.0 | 1.8 |
|  | Methylene chloride | 5.0 | 4.6 | 5.0 | 3.0 |
|  | Tetrahydrofuran | 5.6 | 3.5 | — | — |
| Physical Properties | Density (g/cm$^3$) | 0.092 | 0.098 | 0.119 | 0.124 |
|  | Tensile strength (kg/cm$^2$) | 1.19 | 2.48 | 2.27 | 0.86 |
|  | Extensibility (%) | 124 | 106 | 124 | 130 |
|  | Impact resilience test (%) | 3.9 | 8.3 | 34.7 | 12.5 |
|  | Waterproof text (sec) | 13,300 | 57,900 | 170 | 55 |
|  | Thermal resistance test*[1] | | | | |
|  | Tensile strength loss (%) | −3.4 | −2.4 | −64.9 | −2.4 |
|  | Extensibility loss (%) | −5.6 | −5.6 | −79.2 | −4.8 |
|  | Wet heat resistance test*[2] | | | | |
|  | Tensile strength loss (%) | −1.7 | −5.4 | −15.3 | −9.5 |
|  | Extensibility loss (%) | −0.8 | −3.3 | −13.8 | −8.1 |

*[1]Thermal resistance test condition: 140° C., 22 hours
*[2]Wet heat resistance test condition: 100° C., 100% humidity, 3 hours As indicated by the data in Table 1, the polyurethane foam having the polyisobutylene skeleton according to the invention exhibits excellent tensile strength and wet heat resistance as compared with a widely used polyesther polyurethane foam, and also shows excellent water repellency and waterproofness. Further, as compared with the polybutadiene-polyurethane foam having a double bond in the molecule (Comparative Example 1), the polyurethane foam according to the invention has far superior thermal resistance, wet heat resistance and waterproofness.

EFFECT OF THE INVENTION

As explained above, the polyurethane foam made with the polyisobutylene skeleton according to the invention has an outstanding combination of physical properties, such as excellent tensile strength, wet heat resistance, thermal resistance, oxidation resistance, low gas permeation properties, and low temperatures characteristics together with excellent waterproofness and impact resilience.

While the preferred embodiment of the invention has been described above, it is to be understood that the invention is not limited thereto or thereby but that the scope of the invention is defined by the appended claims.

What is claimed is:

1. A polyurethane foam having a polyisobutylene skeleton obtained by reacting a polyisobutylene having terminal hydroxy groups as a polyhydroxy compound with polyisocyanate in the presence of a blowing agent.

2. A polyurethane foam according to claim 1, wherein the polyisobutylene having terminal hydroxy groups has two or more hydroxy groups per 1 polyisobutylene polymer.

3. A polyisobutylene having terminal hydroxy groups according to claim 2, wherein the polyisobutylene has three terminal hydroxy groups.

4. A polyisobutylene having terminal hydroxy groups according to claim 3, wherein the polyisobutylene having three terminal hydroxy groups is made by use of 1,3,5-tris-(2-methoxypropane)-benzene.

5. A polyisobutylene having terminal hydroxy groups according to claim 3, wherein the molecular weight of said polyisobutylene is between 1000–10000.

6. A polyisobutylene having terminal hydroxy groups according to claim 3, wherein the molecular weight of said polyisobutylene is preferably between 2000–7000.

7. A polyisobutylene having terminal hydroxy groups according to claim 2, wherein the polyisobutylene has two terminal hydroxy groups.

8. A polyisobutylene having terminal hydroxy groups according to claim 7, wherein the polyisobutylene having two terminal hydroxy groups is made by use of 1,3-tris-(2-methoxypropane)-benzene.

9. A polyisobutylene having terminal hydroxy groups according to claim 7, wherein the molecular weight of said polyisobutylene is between 1000–10000.

10. A polyisobutylene having terminal hydroxy groups according to claim 7, wherein the molecular weight of said polyisobutylene is preferably between 2000–7000.

* * * * *